(12) United States Patent
Tobias et al.

(10) Patent No.: US 12,535,427 B2
(45) Date of Patent: *Jan. 27, 2026

(54) PROBING FILM THAT ABSORBS AND REACTS WITH GASES, WITH LIGHT OF DIFFERENT WAVELENGTHS, HUMIDITY DETECTION, AND OPTIONALLY TEMPERATURE DETECTION

(71) Applicant: Honeywell International Inc., Morris Plains, NJ (US)

(72) Inventors: Peter Tobias, Minneapolis, MN (US); Christopher Zins, Coon Rapids, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 510 days.

This patent is subject to a terminal disclaimer.

(21) Appl. No.: 16/074,860

(22) PCT Filed: Feb. 10, 2017

(86) PCT No.: PCT/US2017/017382
§ 371 (c)(1),
(2) Date: Aug. 2, 2018

(87) PCT Pub. No.: WO2017/139584
PCT Pub. Date: Aug. 17, 2017

(65) Prior Publication Data
US 2019/0041338 A1 Feb. 7, 2019

Related U.S. Application Data

(60) Provisional application No. 62/294,187, filed on Feb. 11, 2016.

(51) Int. Cl.
*G01N 21/78* (2006.01)
*G01N 21/25* (2006.01)
(Continued)

(52) U.S. Cl.
CPC .......... *G01N 21/783* (2013.01); *G01N 21/25* (2013.01); *G01N 21/8483* (2013.01); *G01N 31/223* (2013.01); *G01N 2201/0627* (2013.01)

(58) Field of Classification Search
CPC ...... G01N 21/25; G01N 21/77; G01N 21/783; G01N 21/81; G01N 21/8483;
(Continued)

(56) References Cited

U.S. PATENT DOCUMENTS 2,800,397 A 7/1957 Offutt et al.
3,827,808 A 8/1974 Cho
(Continued)

FOREIGN PATENT DOCUMENTS

CN 101416046 A 4/2009
CN 102636442 A 8/2012
(Continued)

OTHER PUBLICATIONS

International Application No. PCT/US2017/017361, Written Opinion of the International Searching Authority, mailed May 24, 2017, 7 pages.
(Continued)

*Primary Examiner* — Matthew D Krcha
*Assistant Examiner* — Austin Q Le
(74) *Attorney, Agent, or Firm* — Alston & Bird LLP (57) ABSTRACT

Disclosed herein are methods and systems for distinguishing a target gas from other target gases, which involve a configuration of a light source (120) and paper tape (110) such that light (112) emitted from the light source (120) can reflect off the paper tape (110). A reflected portion (114) of the light (112) can be detected, as well as the humidity and optionally the temperature. The light (112) can emit in at least three wavelengths selected from red, green, blue, and ultra-violet wavelengths, and pattern recognition can be
(Continued)

used to identify and/or distinguish the target gas from the group of target gases based on wavelength detection information and the one or more of the humidity and the temperature.

19 Claims, 8 Drawing Sheets

(51) Int. Cl.
   *G01N 21/84* (2006.01)
   *G01N 31/22* (2006.01)

(58) Field of Classification Search
   CPC ......... G01N 31/223; G01N 2201/0484; G01N 2201/06; G01N 2201/062; G01N 2201/0612; G01N 2201/0621; G01N 2201/0627; G01N 2021/31; G01N 2021/314; G01N 2021/3148; G01N 2021/3155; G01N 21/251; G01N 21/766; G01N 21/7773; G01N 31/22; G01N 31/224; G01N 31/225
   See application file for complete search history.

(56) References Cited

U.S. PATENT DOCUMENTS

| | | | |
|---|---|---|---|
| 4,181,699 A | 1/1980 | Kitzinger | |
| 5,091,642 A * | 2/1992 | Chow | G01N 21/783 250/226 |
| 5,239,175 A | 8/1993 | Jawad et al. | |
| 5,397,538 A | 3/1995 | Stark et al. | |
| 6,406,669 B1 | 6/2002 | Duan et al. | |
| 7,504,958 B1 * | 3/2009 | Genovese | G01N 1/2202 340/634 |
| 7,996,159 B2 | 8/2011 | Mottier | |
| 8,836,520 B1 | 9/2014 | Crook | |
| 2002/0148948 A1 | 10/2002 | Hensel | |
| 2007/0188425 A1 | 8/2007 | Saccomanno | |
| 2007/0243107 A1 | 10/2007 | Chase et al. | |
| 2008/0259341 A1 | 10/2008 | Short et al. | |
| 2009/0111191 A1 | 4/2009 | Bonne et al. | |
| 2010/0277740 A1 | 11/2010 | Hulteen et al. | |
| 2012/0019815 A1 | 1/2012 | Horikoshi et al. | |
| 2012/0063956 A1 * | 3/2012 | Truex | G01N 21/783 422/86 |
| 2012/0202294 A1 * | 8/2012 | Jin | G01N 21/8483 436/164 |
| 2012/0304729 A1 | 12/2012 | O'Dell et al. | |
| 2013/0010288 A1 | 1/2013 | Dwyer et al. | |
| 2013/0071290 A1 | 3/2013 | Oum et al. | |
| 2013/0186279 A1 | 7/2013 | Dwyer et al. | |
| 2013/0229658 A1 | 9/2013 | Jouanique-Dubuis et al. | |
| 2013/0236980 A1 * | 9/2013 | Moretti | G01N 21/783 436/133 |
| 2013/0259749 A1 * | 10/2013 | Moretti | A61B 5/742 436/133 |
| 2014/0036270 A1 | 2/2014 | Hulteen et al. | |
| 2015/0103346 A1 | 4/2015 | Erdtmann | |
| 2015/0241345 A1 | 8/2015 | Jin et al. | |
| 2015/0362476 A1 | 12/2015 | Clements et al. | |
| 2015/0367149 A1 | 12/2015 | Greenawald et al. | |
| 2017/0030874 A1 | 2/2017 | Harrison et al. | |
| 2017/0248514 A1 | 8/2017 | Pavey et al. | |
| 2020/0003697 A1 * | 1/2020 | Nakamura | G01M 3/22 |

FOREIGN PATENT DOCUMENTS

| | | |
|---|---|---|
| CN | 102834711 A | 12/2012 |
| CN | 103189736 A | 7/2013 |
| CN | 203385442 U | 1/2014 |
| CN | 104736989 A | 6/2015 |
| DE | 3526495 A1 | 2/1986 |
| EP | 0477300 A1 | 4/1992 |
| EP | 0733901 A2 | 9/1996 |
| EP | 1043583 A2 | 10/2000 |
| EP | 2487482 A1 | 8/2012 |
| GB | 1100810 A | 1/1968 |
| IN | 31/2007 | 3/2007 |
| JP | H075110 A | 1/1995 |
| JP | 2008241311 A | 10/2008 |
| JP | 5327965 B2 | 10/2013 |
| KR | 10-2012-0000102 A | 1/2012 |
| WO | 9812542 A1 | 3/1998 |
| WO | 2006/016623 A1 | 2/2006 |
| WO | 2010117599 A2 | 10/2010 |
| WO | 2011123403 A1 | 10/2011 |
| WO | 2015/085186 A1 | 6/2015 |
| WO | 2017139523 A1 | 8/2017 |
| WO | 2017139568 A1 | 8/2017 |
| WO | 2017139584 A1 | 8/2017 |

OTHER PUBLICATIONS

International Application No. PCT/US2017/017382, International Preliminary Report on Patentability, mailed Aug. 14. 2018, 8 pages.
International Application No. PCT/US2017/017288, International Preliminary Report on Patentability, mailed Aug. 14. 2018, 8 pages.
International Application No. PCT/US2017/017361, International Preliminary Report on Patentability, mailed Aug. 14. 2018, 8 pages.
U.S. Appl. No. 16/074,868, filed Aug. 2, 2018, 31 pages.
U.S. Appl. No. 16/074,847, filed Aug. 2, 2018, 39 pages.
International Application No. PCT/US2017/017382, International Search Report, mailed May 24, 2017, 4 pages.
International Application No. PCT/US2017/017382, Written Opinion of the International Searching Authority, mailed May 24, 2017, 7 pages.
Xiong et al., "Amperometric Gas detection: A review", International Journal of Electrochemical Science, vol. 9., Sep. 29, 2014, pp. 7152-7181.
Micronas GAS 86xyB—Digital Gas Sensor Platform, Jul. 2013, 8 pages.
International Application No. PCT/US2017/017288, International Search Report, mailed Apr. 24, 2017, 4 pages.
International Application No. PCT/US2017/017288, Written Opinion of the International Searching Authority, mailed May 24, 2017, 7 pages.
International Application No. PCT/US2017/017361, International Search Report, mailed May 24, 2017, 4 pages.
CN Office Action Mailed on Aug. 28, 2020 for CN Application No. 201780022771.
CN Search report Mailed on Aug. 21, 2020 for CN Application No. 201780022771.
English Translation of CN Office Action Mailed on Aug. 28, 2020 for CN Application No. 201780022771.
Advisory Action (PTOL-303) Mailed on Nov. 17, 2020 for U.S. Appl. No. 16/074,868.
Annex to the communication Mailed on Jun. 30, 2020 for EP Application No. 17707448, 5 pages.
Communication from the Examining Division pursuant to Article 94(c) EPC, mailed on Jun. 30, 2020 for EP Application No. 17707448, 7 pages.
Communication from the Examining Division pursuant to Rules 161(1) and 162 EPC, mailed on Oct. 10, 2018 for EP Application No. 17707449, 3 pages.
Non-Final Rejection Mailed on May 8, 2020 for U.S. Appl. No. 16/074,868.
United States Non-Final Rejection Mailed on Jul. 8, 2020 for U.S. Appl. No. 16/074,847, 12 pages.
Final Rejection Mailed on Sep. 11, 2020 for U.S. Appl. No. 16/074,868.
Communication about intention to grant a European patent received for European Application No. 17707448.1, mailed on Jul. 1, 2021, 6 pages.
English Translation of KR Office Action Mailed on Jan. 29, 2021 for KR Application No. 10-2018-7026216, 2 pages.

(56) References Cited

OTHER PUBLICATIONS

KR Office Action Mailed on Jan. 29, 2021 for KR Application No. 10-2018-7026216, 3 pages.
Final Office Action received for U.S. Appl. No. 16/074,868, mailed on Jun. 14, 2021, 26 pages.
Non-Final Rejection Mailed on Feb. 25, 2021 for U.S. Appl. No. 16/074,847.
CN Notice of Allowance Mailed on May 6, 2021 for CN Application No. 201780022771, 2 pages.
English translation of CN Notice of Allowance Mailed on May 6, 2021 for CN Application No. 201780022771, 3 pages.
English translation of KR Notice of Allowance Mailed on Jun. 14, 2021 for KR Application No. 10-2018-7026216, 2 pages.
KR Notice of Allowance Mailed on Jun. 14, 2021 for KR Application No. 10-2018-7026216, 2 pages.
Non-Final Rejection Mailed on Feb. 1, 2021 for U.S. Appl. No. 16/074,868.
Communication from the Examining Division pursuant to Article 94(3) EPC Mailed on Sep. 22, 2021 for EP Application No. 17707449, 7 pages.
Final Office Action received for U.S. Appl. No. 16/074,847, dated Dec. 7, 2021, 50 pages.
Decision to grant a European patent Mailed on Nov. 5, 2021 for EP Application No. 17707448, 2 pages.
Non-Final Office Action Mailed on Aug. 27, 2021, U.S. Appl. No. 16/074,868, 30 pages.
Advisory Action received for U.S. Appl. No. 16/074,868, mailed on Apr. 29, 2022, 4 pages.
Advisory Action, including Examiner-Initiated Interview Summary and AFCP 2.0 Decision, mailed Mar. 15, 2022, for U.S. Appl. No. 16/074,847, 14 pages.
Final Office Action received for U.S. Appl. No. 16/074,868, mailed on Feb. 22, 2022, 20 pages.
Advisory Action, including Examiner Initated Interview Summary, received for U.S. Appl. No. 16/074,847, mailed on Mar. 15, 2022, 4 pages.
Non-Final Office Action received for U.S. Appl. No. 16/074,868, mailed on Jun. 15, 2022, 7 pages.
Non-Final Office Action received for U.S. Appl. No. 16/074,847, mailed on Sep. 15, 2022, 14 pages.
Extended European search report Mailed on Jul. 18, 2022 for EP Application No. 21201238, 8 pages.
Advisory Action (PTOL-303) Mailed on Jul. 31, 2023 for U.S. Appl. No. 16/074,847, 3 page(s).
CN Office Action, including Search Report Mailed on Jun. 3, 2023 for CN Application No. 202110824200, 9 page(s).
English Translation of CN Office Action dated Jun. 3, 2023 for CN Application No. 202110824200, 1 page(s). Summary only.
Final Rejection Mailed on Apr. 21, 2023 for U.S. Appl. No. 16/074,847, 13 page(s).
Examiner Interview Summary Record (PTOL-413) Mailed on Apr 20, 2023 for U.S. Appl. No. 16/074,868, 1 page(s).
Notice of Allowance and Fees Due (PTOL-85) Mailed on Apr. 20, 2023 for U.S. Appl. No. 16/074,868, 10 page(s).
Non-Final Rejection Mailed on Oct. 3, 2023 for U.S. Appl. No. 16/074,847, 13 page(s).
CN Office Action Mailed on Nov. 10, 2023 for CN Application No. 202110824200, 3 page(s).
English Translation of CN Office Action dated Nov. 10, 2023 for CN Application No. 202110824200, 3 page(s).
Intention to grant Mailed on Nov. 9, 2023 for EP Application No. 17707449, 9 page(s).
EP Office Action Mailed on Aug. 16, 2024 for EP Application No. 21201238, 6 page(s).
Decision to grant a European patent Mailed on Mar. 14, 2024 for EP Application No. 17707449, 2 page(s).
Notice of Allowance and Fees Due (PTOL-85) Mailed on Apr. 8, 2024 for U.S. Appl. No. 16/074,847, 11 page(s).
CN Notice of Allowance Mailed on Apr. 21, 2024 for CN Application No. 202110824200, 2 page(s).
English translation of CN Notice of Allowance dated Apr. 21, 2024 for CN Application No. 202110824200, 3 page(s).
Intention to grant Mailed on Nov. 25, 2025 for EP Application No. 21201238, 8 page(s).

\* cited by examiner

PROBING FILM THAT ABSORBS AND REACTS WITH GASES, WITH LIGHT OF DIFFERENT WAVELENGTHS, HUMIDITY DETECTION, AND OPTIONALLY TEMPERATURE DETECTION

CROSS-REFERENCE TO RELATED APPLICATIONS

The present application is the National Stage of International Application No. PCT/US2017/017382 filed Feb. 10, 2017 and entitled "Probing Film that Absorbs and Reacts with Gases, with Light of Different Wavelengths, Humidity Detection, and optionally Temperature Detection," which claims priority to U.S. Provisional Patent Application No. 62/294,187 filed Feb. 11, 2016, and entitled "Probing Film that Absorbs and Reacts with Gases, with Light of Different Wavelengths, Humidity Detection, and optionally Temperature Detection," such that the present application claims priority to both listed related applications, both of which are incorporated herein by reference as if reproduced in their entirety.

BACKGROUND

Gas detectors can be configured to detect one or more gases for the purpose of monitoring the concentration and/or maintaining a threshold level of one or more gases in an environment. In some instances, gas detectors include a film impregnated with one or more chemicals which react with a gas being detected. The film darkens and/or stains when contacted by the gas being detected. A challenge with these types of gas detectors is the detection of gases which produce a different stain color at different conditions. These gases can be confused with other gases which coincidentally produce the same or undetectably different stain color under certain conditions. Thus, there is a need to distinguish these gases when the stains coincidentally have the same or an undetectably different stain.

SUMMARY

Disclosed herein are methods for distinguishing a target gas from a group of target gases. For example, the method can comprise contacting a gas stream with a paper tape; emitting at least three wavelengths of light selected from red, green, blue, and ultra-violet wavelengths from a light source; detecting a reflected portion for each of the three wavelengths of light which reflects from the paper tape; sensing one or more of a humidity and a temperature of the gas stream; and using pattern recognition to identify and/or distinguish the target gas from the group of target gases based on wavelength detection information and the one or more of the humidity and the temperature.

Also disclosed herein are systems for distinguishing a target gas from a group of target gases. For example, the system comprises a paper tape; a light source configured to emit at least three wavelengths of light selected from red, green, blue, or ultra-violet wavelength; a detector configured to detect a reflected portion for each of the three wavelengths of light which reflects from the paper tape; a sensor configured to sense one or more of a humidity and a temperature of the gas stream; and a processor/controller connected to the detector to: i) receive a digital signal containing detection information for the reflected portion (114) from the detector (130), ii) use pattern recognition to identify and/or distinguish the target gas from the group of target gases based on wavelength detection information and the one or more of the humidity and the temperature.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 5 shows a 4× standard deviation box for $H_2Se$.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:
- The term "comprising" means including but not limited to, and should be interpreted in the manner it is typically used in the patent context;
- The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);
- If the specification describes something as "exemplary" or an "example," it should be understood that refers to a non-exclusive example;
- The terms "about" or "approximately" or the like, when used with a number, may mean that specific number, or alternatively, a range in proximity to the specific number, as understood by persons of skill in the art field; and
- If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include gas detector configurations and gas detection methods for distinguishing a target gas from a group of target gases. The embodiments include contacting a gas stream with a paper tape; emitting at least three wavelengths of light selected from red, green, blue, and ultra-violet wavelengths from a light source; detecting a reflected portion for each of the three wavelengths of light which reflects from the paper tape; sensing one or more of a humidity and a temperature of the gas stream; and using pattern recognition to identify and/or distinguish the target gas from the group of target gases based on wavelength detection information and one or more of the humidity and the temperature. Thus, the disclosed embodiments allow for reducing confusion among the same type of gases in a group of gases when at least one of the gases in the group of gases creates stains in the paper tape for which the color depends on the humidity.

"Humidity" generally refers to relative humidity, the measurement and calculation of which is known in the art.

In embodiments, the gas stream can be any gas such as oxygen, nitrogen, or a combination of oxygen and nitrogen (e.g., air).

In embodiments, a target gas in the gas stream can be one or more of hydrogen sulfide ($H_2S$), hydrogen selenide ($H_2Se$), diborane ($B_2H_6$), germane ($GeH_4$), silane ($SiH_4$), phosphine ($PH_3$), arsine ($AsH_3$), ammonia ($NH_3$), or a combination thereof.

In an embodiment, the group of gases can be any known group of gases, such as any group to which the above-identified target gases belong, and for example, hydrides.

Figure 1:
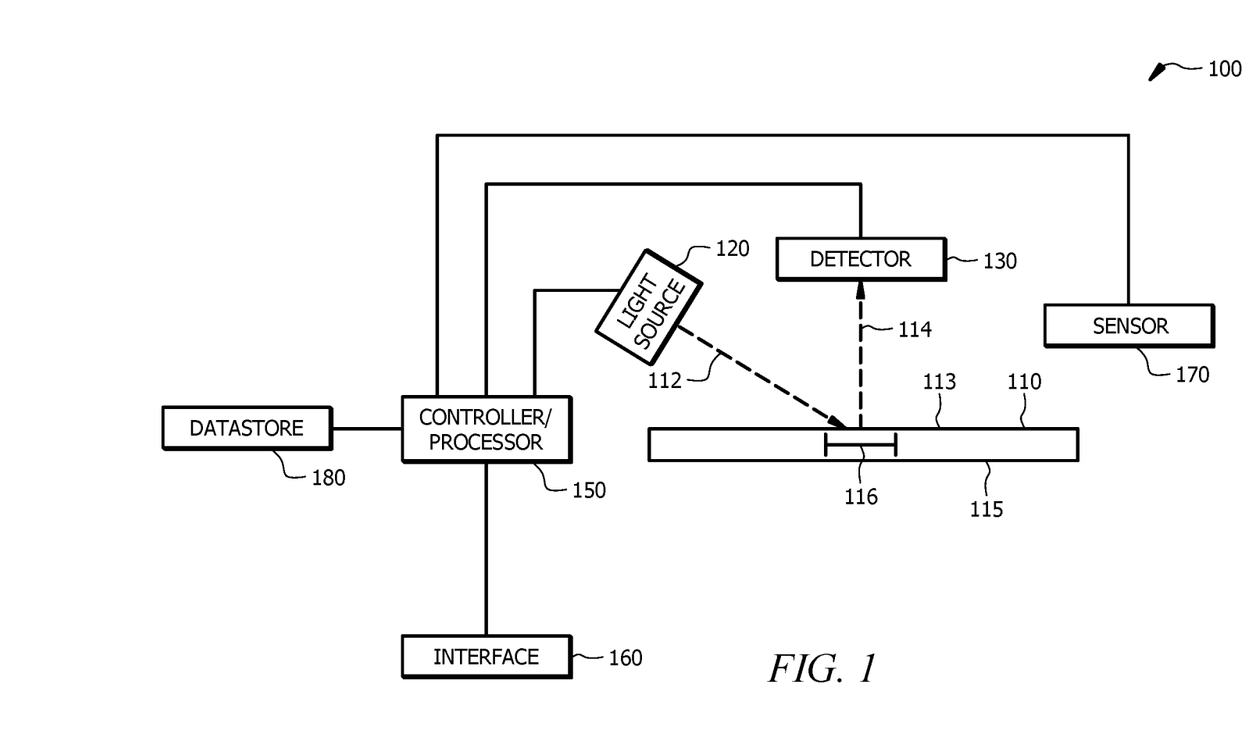
FIG. 1 illustrates a gas detection system in accordance with the disclosure.

Referring now to FIG. 1, an embodiment of a gas detection system 100 according to the disclosure is shown. The system 100 may be referred to as a toxic gas analyzer cassette. The system 100 includes a paper tape 110, a light source 120 configured to emit light 112, a detector 130 configured to detect at least some of the reflected portion 114 of light 112 which reflects from the paper tape 110, and a sensor 170 configured to sense one or more of the humidity and the temperature of a gas stream. As can be seen in FIG. 1, the system 100 may further optionally include a controller/processor 150 and an interface 160. The controller/processor 150 may be connected to the light source 120, the detector 130, the interface 160, the sensor 170, or a combination thereof.

The paper tape 110 is a chemically treated paper that reacts with a target gas which comes into contact with the paper tape 110 via flow of gas stream containing the target gas over the paper tape 110, through the paper tape 110, or both over and through the paper tape 110. The chemical treatment may be an impregnation of the paper tape with one or more chemicals. The paper tape 110 may also be referred to as an absorber film, a hydride tape, or a oxidizer tape. In embodiments, flow of the gas stream is focused to a region 116 of the paper tape 110. The paper tape 110 reacts with a target gas when contacted with the target gas, and the reaction forms a stain on the paper tape 110 (the stain being the reaction product produced by contact of the target gas with the paper tape 110). The stain produced by contact of the target gas with the paper tape 110 can be a color depending on the target gas and the chemical used to chemically treat the paper to yield the paper tape 110. For example, $PH_3$ produces a rust-colored stain, $AsH_3$ produces a gray-colored or black-colored stain, and toluene-di-isocyanate produces a brown-colored or black-colored stain. Moreover, the stain can have a particular strength, e.g., light, medium, or dark. A particular paper tape 110 may yield stains for one or more target gases while not yielding stains for other gases, depending on the chemical treatment. An unstained paper tape 110 can be referred to as being in a "white" state. Staining of the paper tape 110 generally transforms the paper tape 110 from a white state to a stained state, indicating the presence of one or more target gases in the gas stream. Reference to a "white" paper tape 110 generally refers to the paper tape 110 before contact with any target gas, regardless of the color of paper tape 110 (e.g., the paper tape 110 can have a yellowish hue instead of being bright white).

Embodiments of the light source 120 generally include any device which can emit more than one wavelength of light. In one embodiment, the light source 120 emits light which includes wavelengths corresponding to two or more of red, green, blue, and ultra-violet. In another embodiment, the light source 120 is a broadband light source which emits multiple wavelengths of light.

The light source 120 can be in the form of LEDs. The one or more LEDs may be selected from i) one or more broadband LED which emits a combination of wavelengths of light (e.g., a combination of red, green, and blue (RGB) wavelengths of light), or ii) multiple LEDs, each of which emits a single wavelength of light (e.g., each LED emits one of green, red, blue, or ultraviolet).

Examples of LEDs which emit red, green, and blue wavelengths of light are a RGB-LED from Thorlabs® (part number LEDRGBE) and a SMD-LED from Bivar (part number SMP4-RBG).

The system 100 is configured such that the light emitted from the light source 120 travels to or is directed to (e.g., via a light pipe) a region 116 of the paper tape 110 for reflection from the side 113 of the paper tape 110.

The detector 130 is any photodetector device known in the art for detecting one or more wavelengths of the light 112 which reflects from the paper tape 110. The detector 130 is positioned on the side 113 of the paper tape 110 so that the detector 130 can detect the reflected portion 114 of light 112 which reflects from the paper tape 110 and reaches the detector 130. The detector 130 may output signals that indicate intensity (e.g., the amount of light) and/or color (e.g., wavelength of the light) of the portion 114 of light 112. The detector 130 may be connected to a controller/processor 150, which may provide further analysis of the detected portion 114 of light 112.

In embodiments where the light source 120 is a broadband light source, the detector 130 can be a multi-wavelength detector. In such embodiments, the paper tape 110 can be illuminated with white light and the spectral distribution of the reflected portion 114 can be detected and analyzed, where the fluorescing light is counted for the wavelength where the light fluoresces. In embodiments where the light source 120 emits specific wavelengths of light (e.g., red, green, blue, UV, or a combination thereof), the detector 130 is configured to detect the specific wavelengths. In such embodiments, a count is made for whichever specific wavelength was activated in the light source 120.

The controller/processor 150 can provide further analysis of detected reflected portion 114 of light 112. The controller/processor 150 may also control parameters of the light source 120, for example, whether and when the light source 120 turns on and off, the intensity (e.g., the amount of light) of the light source 120, which portions(s) (e.g., which wavelength(s)) of the light source 120 are active or inactive, or a combination thereof.

An interface 160 can be connected to the controller/processor 150. In an embodiment, the interface 160 is a MM-interface.

The sensor 170 can be any sensor known in the art for sensing the relative humidity (RH) of the gas stream and which is combinable with the components of system 100. In some embodiments, the sensor 170 can also sense the temperature of the gas stream. Examples of sensor 170 include the Humidicon® HIH6000 Series sensors, Humidicon® HIH6100 Series sensors, HIH-4000 Series sensors, and HIH-04010/4020/4021 Series sensors, all commercially available from Honeywell®. In an embodiment, the sensor 170 can be positioned upstream of the paper tape 110 such that the sensor 170 senses one or more of humidity and temperature before the gas stream reaches the paper tape 110 (thus sensing the gas stream unaltered in composition by any reaction with the paper tape 110). Alternatively, the sensor 170 can be positioned downstream of the paper tape 110 such that the sensor 170 senses one or more of humidity and temperature after the gas stream reaches the paper tape 110 (thus sensing the gas stream possibly having an altered composition because of reaction of gases with the paper tape 110).

In operation, a gas stream containing one or more gases contacts the paper tape 110 by being directed over or through the paper tape 110, e.g., over or through at least the region 116 of the paper tape 110. The direction of flow of the gas stream can be any direction which allows for contact of any target gases with region 116 of the paper tape 110. Directions of flow include i) flow on the side 113 of the paper tape 110 and perpendicular to the reflected portion 114 (from right to left or from left to right as looking at FIG. 1), ii) flow on the side 113 of the paper tape 110 and at any angle (including zero) with respect to the reflected portion 114, or iii) flow at any angle (including zero) with respect to reflected portion 114 and through the paper tape 110 from the side 113 to the opposite side 115 with subsequent flow away from the opposite side 115 at any angle with respect to the paper tape 110, or a combination thereof.

At least one target gas in the one or more gases of the gas stream can react with the paper tape 110 and lead to a darkening or staining of the paper tape 110.

The controller/processor 150 controls the light source 120 so as to activate the light source according to the techniques disclosed herein. Generally, the controller/processor 150 controls the color (i.e., wavelength) and intensity (e.g., amount) of light 112 emitted from the light source 120. For example, the light source 120 can be activated (e.g., flashed) in light pulses of 1, 2, 3, 4, 5, 6, 7, 8, 9, 10, or more ms. During each activation or flash, the light source 120 flashes the wavelength of a single color (e.g., red, green, blue, or UV) or of multiple wavelengths (e.g., for a broadband light source). The light source 120 may be activated any number of times for any order of the wavelengths.

Generally, the light 112 (e.g., whichever wavelength(s) is activated for the particular light pulse) emitted from the light source 120 is directed to the paper tape 110 (e.g., to a particular region 116 of the paper tape 110) by facing the light source 120 to the side 113 of the paper tape 110 or by using a light pipe to direct the light to the side 113 of the paper tape 110. A portion 114 of the light 112 reflects from the side 113 of the paper tape 110, and the detector 130 detects the reflected portion 114 of the light 112 emitted from the light source 120.

The detector 130 communicates with the controller/processor 150 regarding the detected portion 114 of light 112. Generally, the detector 130 converts the detected light signal to a digital signal which is communicated to the controller/processor 150. The controller/processor 150 is configured to correlate the detection information received in the digital signal from the detector 130 with the corresponding wavelength information for light 112 emitted from the light source 120. The controller/processor 150 can be operably connected with a datastore for storing and/or aiding in the processing of the detection information and/or wavelength information.

The sensor 170 senses the relative humidity of the gas stream, either before or after contact of the gas stream with the paper tape 110. The sensor 170 can optionally also sense the temperature of the gas stream while sensing the humidity. The sensor 170 communicates with the controller/processor 150 regarding the sensed conditions (humidity and optionally temperature). Generally, the sensor 170 converts the detected conditions to an electronic or digital signal which is communicated to the controller/processor 150. The controller/processor 150 is configured to use the sensed information received in the signal from the sensor 170 in distinguishing a target gas from a group of gases.

For each light pulse of each wavelength of light emitted from the light source 120 and detected by the detector 130, the controller/processor 150 calculates an adjusted count (herein "AC"), defined by the following equation (1):

$$AC = [S(0)/S(t)] - 1 \quad (1)$$

wherein S(0) is the original intensity of the light 112 emitted from the light source 120 at time zero and S(t) is the actual intensity of the reflected portion 114 of the light 112 which is detected by the detector 130 at time, t, which is greater than 0. It is contemplated that multiple ACs for each wavelength can be calculated from multiple light pulses of the wavelength to further obtain an average adjusted count of the wavelength of a specified period of total time, e.g., every 1, 2, 3, 4, 5, 6, 7, 8, 9, 10 or more seconds.

The system 100 uses pattern recognition to identify and/or distinguish the target gas from the group of target gases based on wavelength detection information and one or more of the humidity and the temperature of the gas stream. In embodiments, using pattern recognition involves i) using a pattern recognition technique which incorporates the humidity, the temperature, or both the humidity and the temperature of the gas stream, to determine the characteristic or color pattern of the reflected portion for each of the three wavelengths which is detected, ii) matching the characteristic or color pattern with a previously recorded characteristic or previously recorded color pattern, and iii) identifying the characteristic or color pattern as belonging to the target gas or the group of target gases.

Pattern recognition techniques are used to determine characteristics or color patterns of the stains on the paper tape 110 to identify and distinguish a target gas from a group of gases which can also cause stains in the paper tape 110. Suitable pattern recognition techniques include any such techniques known in the art which can use the detected and sensed information in the pattern recognition technique. A pattern recognition technique contemplated by this disclosure includes calculating a characteristic or color pattern for the reflected portion 114 of light 112 for different wavelengths of light 112 by relating the stains measured at different light wavelengths and at the sensed humidity (and optionally also the sensed temperature) to one another and assigning some characteristic or color pattern to one or a group of gases and other characteristics or color patterns to another or other group of gases.

Exemplary techniques are discussed based on the AC of red, green, blue, UV, or a combination thereof, such as the techniques used in Examples 2 to 13 below. The below Examples show the techniques can be used to determine that gases can be distinguished. Because it was determined that gases are indeed distinguishable using pattern recognition techniques, pattern recognition techniques can be used for gas streams flowing in the embodiments of the system 100 of FIG. 1 in order to identify the characteristic or color pattern generated by reflection of light 112 from a stain on the paper tape 110. Moreover, having data that a stain of a gas can change color depending on the humidity level (e.g., a first gas which makes a red stain at humidity 45% and a brown stain at humidity 10% can have at least two characteristics or color patterns, one for the humidity level(s) for which the stain is red and one for the humidity level(s) for which the stain is brown), the color pattern for a detected gas can be correlated with the relative humidity for improved identification of the detected gas. When using the disclosed system 100, the calculated characteristic or color pattern can be matched to a previously recorded (e.g., in a datastore operably connected with the controller/processor 150) characteristic or color pattern to determine the identity of the gas making the stain at the particular sensed humidity.

Confusing a first gas which makes a red stain at humidity 45% and a brown stain at humidity 10% with a second gas which makes a red stain at all humidity levels is avoided, since it would be known (e.g., recorded in a datastore) that both the first gas and second gas produce a red stain at 45% humidity, and the characteristic or color pattern calculated can be matched with the correct gas at 45% humidity.

For example, diborane ($B_2H_6$) produces different stain colors at different humidity levels, and the humidity level is needed in order to distinguish the stain created by $B_2H_6$ at certain humidity levels from the stain of one or more other hydrides at the same humidity level. That is, attempting to identify $B_2H_6$ using the characteristic or color pattern for $B_2H_6$ at only one humidity level may misidentify $B_2H_6$ as another gas at another humidity level if humidity is not considered. The calculated characteristic or color pattern (which takes into account the humidity and optionally temperature) for a detected gas can be compared with the previously recorded characteristic or color pattern of $B_2H_6$ at the measured humidity level to determine whether the target gas is $B_2H_6$ or another gas.

Pattern recognition techniques can include generation of a reference level to which subsequent data is compared. For example, each wavelength of light 112 (red, green, blue, UV) in the light source 120 can be individually flashed for a fresh paper tape (e.g., a fresh region of a paper tape) before exposing the paper tape to a gas stream. The pattern recognition technique can be used to record the reference level (e.g., of color, intensity, or both color and intensity). The controller/processor 150 can subsequently use the reference level when performing the pattern recognition technique on a stain of the paper tape to identify the stain and to distinguish a target gas from a group of target gases.

It is contemplated that the system 100 shown in FIG. 1 can include all the components manufactured on a common circuit board which has circuitry appropriate for connecting components 120, 130, 150, optionally 160, and 170 in any order and arrangement. In an alternative embodiment, wiring which is not embedded in the circuit board can connect the controller/processor 150 to the interface 160. The circuit board and the paper tape 110 can be held in place by a housing of a physical detection unit. The housing can be made of any material and of any configuration suitable for holding the components for gas detection. Additionally, manufacture of the system 100 of FIG. 1 can also include a light pipe which directs the light 112 emitted from the light source 120 to the detector 130. Similar to the housing, the light pipe can be made of material and manufactured according to techniques known in the art. In alternative embodiments, the sensor 170 may be placed in a housing at an appropriate location upstream or downstream of the paper tape 110 such that the sensor 170 is not embodied in the circuit board.

In combination with any of the embodiments disclosed herein, other light source and optionally other detectors can be used for traditional gas detection techniques. In such embodiments, the controller/processor 150 is operable to control the light source 120, detector 130, sensor 170, any additional light source, and any additional detector, such that all components operate in cooperation. For example, the traditional light source may operate using about ten short light pulses per second, with each short light pulse having a duration in a range of 1 ms to 10 ms. The time between the short light pulses of the traditional light source, referred to herein as "dark time," can be used to operate the light source 120 for emission and reflection of light 112 as described for FIG. 1.

The above described systems and methods can include the following embodiments.

Embodiment 1 which is a method for distinguishing a target gas from a group of target gases, the method comprising: contacting a gas stream with a paper tape (110); emitting at least three wavelengths of light (112) selected from red, green, blue, and ultra-violet wavelengths from a light source (120); detecting a reflected portion (114) for each of the at least three wavelengths of light (112) which reflects from the paper tape (110); sensing one or more of a humidity and a temperature of the gas stream; and using pattern recognition to identify and/or distinguish the target gas from the group of target gases based on wavelength detection information and the one or more of the humidity and the temperature.

Embodiment 2 can include embodiment 1, wherein the target gas is $B_2H_6$ and the group of target gases is hydrides.

Embodiment 3 can include any of embodiments 1 to 2, wherein the step of using pattern recognition comprises: using a pattern recognition technique which incorporates the humidity, the temperature, or both the humidity and the temperature of the gas stream, to determine the characteristic or color pattern of the reflected portion (114) for each of the at least three wavelengths which is detected; matching the characteristic or color pattern with a previously recorded characteristic or previously recorded color pattern; and identifying the characteristic or color pattern as belonging to the target gas or the group of target gases.

Embodiment 4 can include any of embodiments 1 to 3, wherein the at least three wavelengths of light are i) red, green, and blue, ii) ultra-violet, red, and green, iii) ultra-violet, green, and blue, or iv) ultra-violet, red, and blue.

Embodiment 5 can include any of embodiments 1 to 4, wherein the at least three wavelengths are emitted as separate light pulses.

Embodiment 6 can include embodiment 5, wherein each of the light pulses has a duration of at least 1 millisecond (ms).

Embodiment 7 can include any of embodiments 1 to 6, further comprising: controlling an intensity of the light (112) emitted from the light source (120).

Embodiment 8 can include any of embodiments 5 to 7, further comprising: calculating, for each of the light pulses of each wavelength of light (112) emitted from the light source (120), an adjusted count defined by the following equation: $AC=[S(0)/S(t)]-1$, wherein $S(0)$ is an original intensity of the light (112) emitted from the light source 120 at time zero and $S(t)$ is an actual intensity of the reflected portion (114) of the light (112) which is detected at time, t, which is greater than 0.

Embodiment 9 can include any of embodiments 1 to 8, wherein the wavelength detection information includes a ratio of adjusted counts (AC) for red wavelength to AC for green wavelength versus a ratio of AC for blue wavelength to AC for green wavelength, for i) the target gas, iii) each gas in the group of target gases, or a combination thereof.

Embodiment 10 can include any of embodiments 1 to 9, wherein the wavelength detection information includes a ratio of AC for red wavelength to the AC for green wavelength versus a ratio of AC for UV wavelength to the AC for green wavelength, for i) the target gas, ii) each gas in the group of target gases, or a combination thereof.

Embodiment 11 can include any of embodiments 1 to 10, wherein the light source (120) includes a UV+GB-LED, a UV+RG-LED, a RGB-LED, or a combination thereof.

Embodiment 12 can include any of embodiments 1 to 11, wherein the pattern recognition is performed by a controller/processor (150) which receives one or more of the humidity and the temperature in the form of a digital or electronic signal from a sensor (170).

Embodiment 13. A system for distinguishing a target gas from a group of target gases, the system comprising: a paper tape (110); a light source (120) configured to emit at least three wavelengths of light (112) selected from red, green, blue, or ultra-violet wavelength; a detector (130) configured to detect a reflected portion (114) for each of the three wavelengths of light (112) which reflects from the paper tape (110); a sensor (170) configured to sense one or more of a humidity and a temperature of the gas stream; and a processor/controller (150) connected to the detector (130) to: i) receive a digital signal containing detection information for the reflected portion (114) from the detector (130), ii) use pattern recognition to identify and/or distinguish the target gas from the group of target gases based on wavelength detection information and the one or more of the humidity and the temperature.

Embodiment 14 can include embodiment 13, further comprising: a datastore (180) operably connected to the processor/controller (150) to record characteristics, color patterns, or both characteristics and color patterns generated by the processor/controller (150).

Embodiment 15 can include any of embodiments 13 to 14, wherein in order to use pattern recognition, the processor/controller (150) is configured to: a) use a pattern recognition technique which incorporates the one or more of the humidity and the temperature of the gas stream, to determine the characteristic or color pattern of the reflected portion (114) for each of the three wavelengths which is detected; b) match the characteristic or color pattern with a previously recorded characteristic or previously recorded color pattern; and c) identify the characteristic or color pattern as belonging to the target gas or the group of target gases.

Embodiment 16 can include any of embodiments 13 to 15, wherein the three wavelengths are emitted as separate light pulses.

Embodiment 17 can include embodiment 16, wherein each of the light pulses has a duration of at least 1 millisecond (ms).

Embodiment 18 can include any of embodiments 16 to 17, wherein the processor/controller (150) is further configured to calculate, for each of the light pulses of each wavelength of light (112) emitted from the light source (120), an adjusted count defined by the following equation: $AC=[S(0)/S(t)]-1$, wherein $S(0)$ is an original intensity of the light (112) emitted from the light source 120 at time zero and $S(t)$ is an actual intensity of the reflected portion (114) of the light (112) which is detected at time, t, which is greater than 0.

Embodiment 19 can include any of embodiments 13 to 18, wherein the processor/controller (150) is further configured to: control an intensity of the light (112) emitted from the light source (120).

Embodiment 20 can include any of embodiments 13 to 19, wherein the at least three wavelengths of light (112) are i) red, green, and blue, ii) ultra-violet, red, and green, iii) ultra-violet, green, and blue, or iv) ultra-violet, red, and blue.

Embodiment 21 can include any of embodiments 13 to 20, wherein the wavelength detection information uses a ratio of adjusted counts (AC) for red wavelength to AC for green wavelength versus a ratio of AC for blue wavelength to AC for green wavelength, for i) the target gas, ii) each gas in the group of target gases, or a combination thereof.

Embodiment 22 can include any of embodiments 13 to 21, wherein the wavelength detection information uses a ratio of AC for red wavelength to the AC for green wavelength versus a ratio of AC for UV wavelength to the AC for green wavelength, for i) the target gas, ii) each gas in the group of target gases, or a combination thereof.

Embodiment 23 can include any of embodiments 12 to 22, wherein the light source (120) includes a UV+GB-LED, a UV+RG-LED, a RGB-LED, or a combination thereof.

EXAMPLES

The subject matter having been generally described, the following examples are given as particular embodiments of the disclosure and to demonstrate the practice and advantages thereof. It is understood that the examples are given by way of illustration and are not intended to limit the specification of the claims to follow in any manner.

Examples 1 to 13 utilized a system comparable to the system 100 of FIG. 1.

Figure 2:
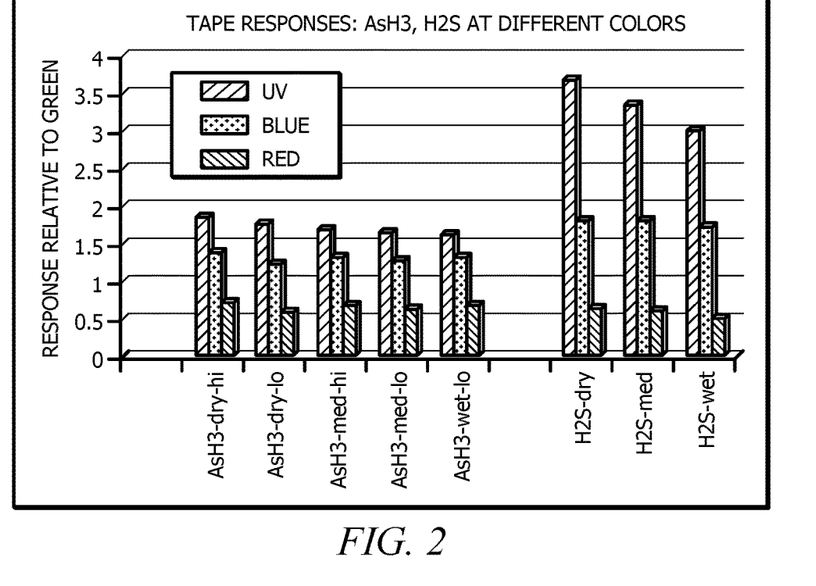
FIG. 2 is a graph of the response of a paper tape configured to detect arsine ($AsH_3$) and hydrogen sulfide ($H_2S$). The response of UV, blue, and red wavelengths relative to the green wavelength response are shown at different humidities.

Example 1 determined the response of a paper tape configured to distinguish hydrogen sulfide ($H_2S$) from arsine ($AsH_3$) which is representative of a group of hydrides. The wavelengths used were red, green, blue, and UV. The response of UV, blue, and red wavelengths relative to the green wavelength response are shown in FIG. 2. The terms in the x-axis of "dry," "med," and "wet," indicate the relative humidity of the sample tested, and the terms "hi" and "low" indicate concentration of $AsH_3$ in the sample. As can be seen, the response of $AsH_3$ to UV, blue, and red wavelengths relative to the green wavelength is distinguishable when compared with the response of $H_2S$ to UV, blue, and red wavelengths relative to the green wavelength, for different concentrations of $AsH_3$ and for different humidity levels for both $AsH_3$ and $H_2S$. While $H_2S$ and $AsH_3$ are distinguishable across a range of humidity levels, it can be seen in FIG. 2 that humidity does play a role in the response, as the response values for $H_2S$ vary with humidity levels and the response values for $AsH_3$ also vary with humidity levels.

Figure 3:
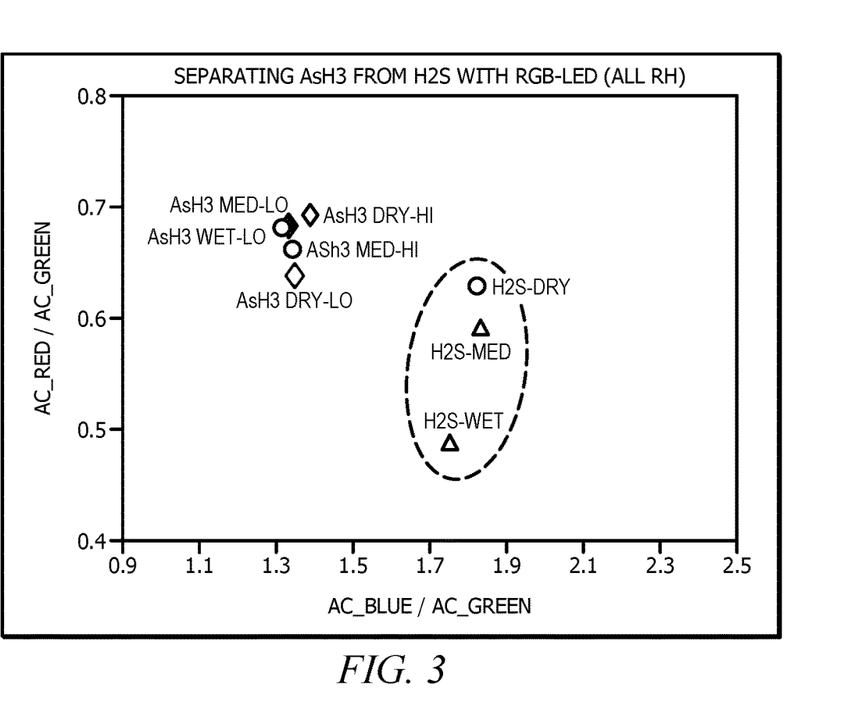
FIG. 3 is a graph of the ratio of adjusted counts (AC) for red wavelength to the AC for green wavelength versus the ratio of AC for blue wavelength to the AC for green wavelength, for each of $AsH_3$ and $H_2S$ using a RGB-LED.

Example 2 was conducted to demonstrate a pattern recognition technique for distinguishing between $AsH_3$ and $H_2S$ using a RGB-LED as the light source. The pattern recognition technique in Example 2 involved calculating a first ratio of adjusted counts (AC) for red wavelength to the AC for green wavelength, calculating a second ratio of AC for blue wavelength to the AC for green wavelength, and comparing the first ratio and second ratio to determine any differences between $AsH_3$ and $H_2S$. The results of Example 2 are shown in FIG. 3. The terms "dry," "med," and "wet," indicate the relative humidity of the gas stream tested, and the terms "hi" and low" indicate concentration of $AsH_3$ in the tested gas stream. As can be seen, using the pattern recognition technique of Example 2 for a RGB-LED light source, stains of $H_2S$ can be distinguished from stains of $AsH_3$ across a range of humidity and a range of concentration of $AsH_3$ in the gas stream. As found in Example 1, while $H_2S$ and $AsH_3$ are distinguishable across a range of humidity levels in Example 2, it can be seen in FIG. 3 that humidity does play a role in the pattern recognition, as the ratio values for $H_2S$ vary with humidity levels, and the ratio values for $AsH_3$ also vary with humidity levels.

Figure 4:
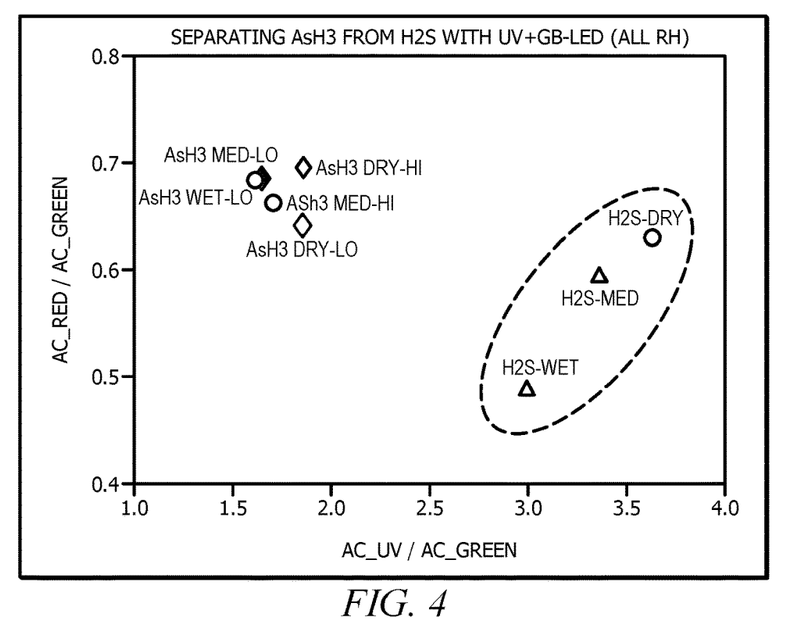
FIG. 4 is a graph of the ratio of AC for red wavelength to the AC for green wavelength versus the ratio of AC for UV wavelength to the AC for green wavelength, for each of $AsH_3$ and $H_2S$ using a UV+GB-LED.

Example 3 was conducted to demonstrate a pattern recognition technique for distinguishing between $AsH_3$ and $H_2S$ using an UV+GB-LED as the light source. The pattern recognition technique in Example 3 involved calculating a first ratio of adjusted counts (AC) for red wavelength to the AC for green wavelength, calculating a second ratio of AC for UV wavelength to the AC for green wavelength, and comparing the first ratio and second ratio to determine any differences between $AsH_3$ and $H_2S$. The results of Example 3 are shown in FIG. 4. The terms "dry," "med," and "wet," indicate the relative humidity of the gas stream tested, and the terms "hi" and "low" indicate concentration of $AsH_3$ in the tested gas stream. As can be seen, using the pattern recognition technique of Example 3 for a UV+GB-LED light source, stains of $H_2S$ can be distinguished from stains of $AsH_3$ across a range of humidity and a range of concentration of $AsH_3$ in the gas stream. As found in Examples 1 and 2, while $H_2S$ and $AsH_3$ are distinguishable across a range of humidity levels in Example 3, it can be seen in FIG. 4 that humidity does play a role in the pattern recognition, as the ratio values for $H_2S$ vary with humidity levels, and the ratio values for $AsH_3$ also vary with humidity levels.

Figure 5:
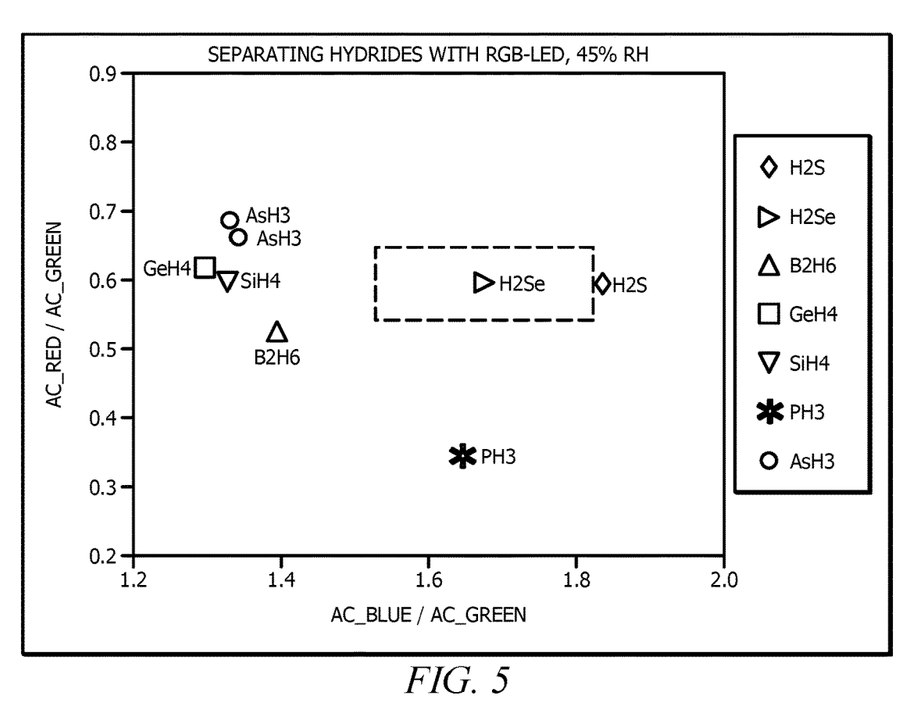
FIG. 5 is a graph of the ratio of AC for red wavelength to the AC for green wavelength versus the ratio of AC for blue wavelength to the AC for green wavelength, for selected gases at 45% relative humidity using a RGB-LED.
Figure 6:
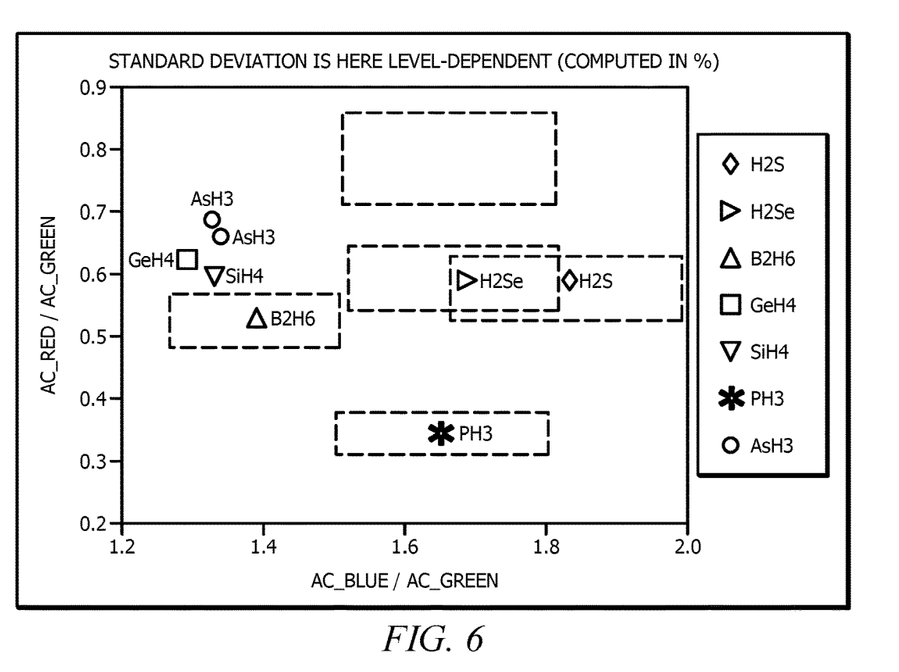
FIG. 6 shows the same graph as FIG. 5, with a 4× standard deviation box for $H_2Se$, as well as 4× standard deviation boxes for $H_2S$, $B_2H_6$, and $PH_3$.

Examples 4 and 5 were conducted to demonstrate the pattern recognition technique used for Example 2 can be used to distinguish $H_2S$ from a group of hydride gases, namely, $H_2Se$, $B_2H_6$, $GeH_4$, $SiH_4$, $PH_3$, and $AsH_3$. All tests were performed at a relative humidity level of 45%. The results of Examples 4 and 5 are shown in FIGS. 5 and 6, respectively. In the pattern recognition technique shown in FIGS. 5 and 6, the value for AC for green wavelength was 100. The systems used to generate the data of FIGS. 5 and 6 utilized a RGB-LED for the light source. The samples had a relative humidity of 45%. The difference between FIG. 5 and FIG. 6 is FIG. 5 shows a 4× standard deviation box for $H_2Se$, and FIG. 6 shows 4× standard deviation boxes for $H_2Se$ as well as $H_2S$, $B_2H_6$, and $PH_3$. The calculated standard deviation is shown in FIGS. 5 and 6 as computed in %, and the measurement thereof originates from 1) variability of the spots on the same paper tape, 2) varying gas concentrations (measurements were consecutive and not in parallel), and 3) other inherent variabilities of the circuits and paper tape. The standard deviation calculation does not include variability among the paper tapes used or any aging effects (only fresh tapes were used). As can be seen, the values for $H_2S$ in the plots of FIGS. 5 and 6 are distinguishable from the other hydrides tested, without taking standard deviation into account. However, when standard deviation calculated as described is taken into account, $H_2S$ is not distinguishable from $H_2Se$.

Examples 6 and 7 were conducted to demonstrate the pattern recognition technique used for Examples 4 and 5 can be used to distinguish $H_2S$ from a group of hydride gases, namely, $H_2Se$, $B_2H_6$, $GeH_4$, $SiH_4$, $PH_3$, and $AsH_3$—at different intensities of the wavelengths of light, for different light sources, and at constant relative humidity. The pattern recognition technique of Example 2 was used in Example 6, and the pattern recognition technique of Example 3 was used in Example 7. The system used to generate the data of FIG. 7 utilized a RGB-LED for the light source. The system used to generate the data of FIG. 8 utilized an UV+RG-LED for the light source. The gas streams tested all had a relative humidity of 45%. The same 4× standard deviation used for Examples 4 and 5 was calculated for Examples 6 and 7.

Figure 7:
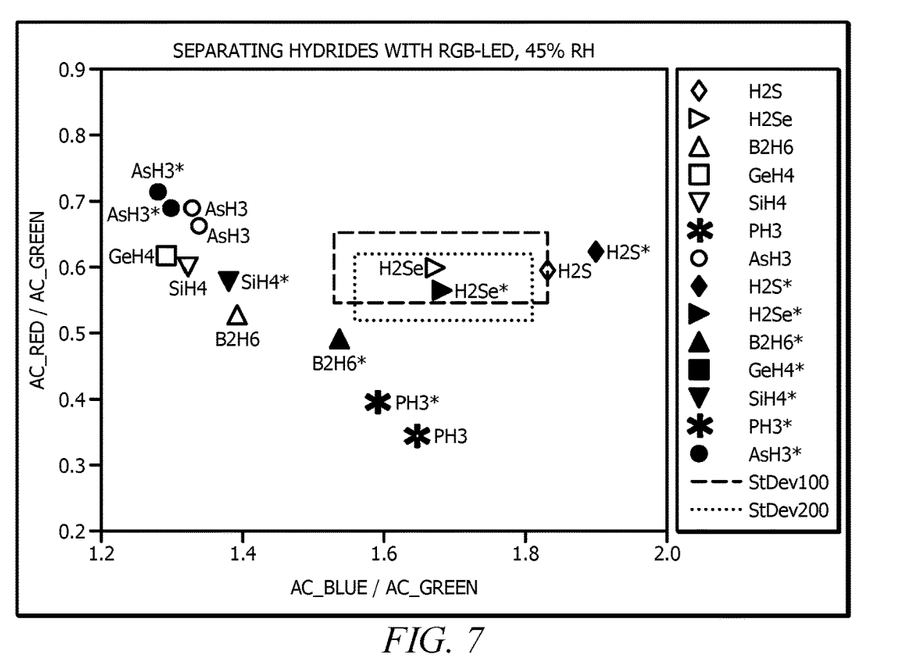
FIG. 7 is a graph of the ratio of AC for red wavelength to the AC for green wavelength versus the ratio of AC for blue wavelength to the AC for green wavelength, for selected gases using a RGB-LED at 45% relative humidity.
Figure 8:
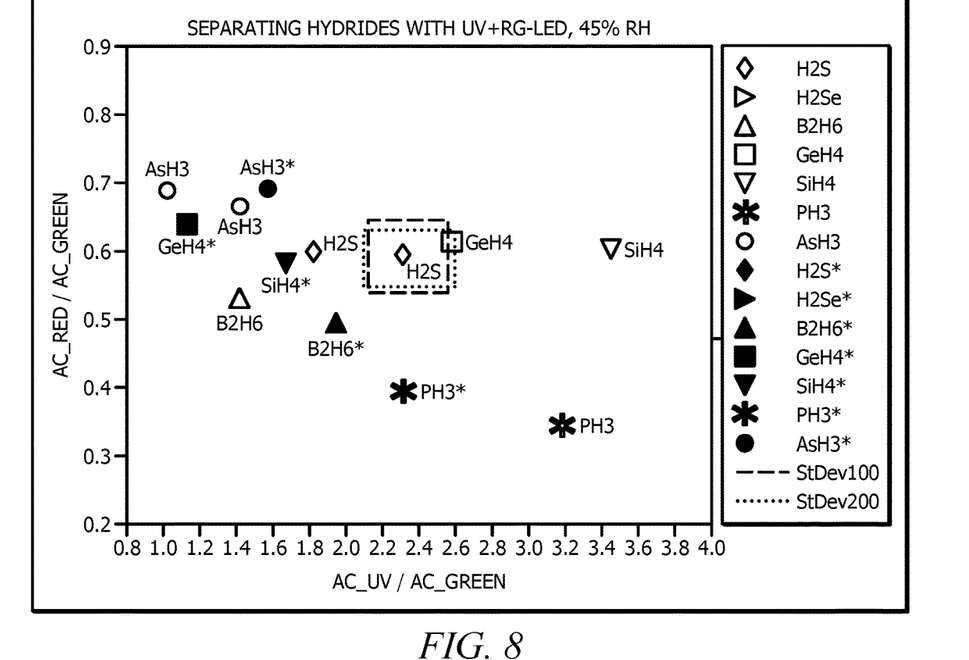
FIG. 8 is a graph of the ratio of AC for red wavelength to the AC for green wavelength versus the ratio of AC for UV wavelength to the AC for green wavelength, for selected gases using a UV+RG-LED at 45% relative humidity.

The results of Examples 6 and 7 are shown in FIGS. 7 and 8, respectively. In the pattern recognition techniques shown in FIGS. 7 and 8, intensities for green wavelength were varied such that AC for green wavelength was 100 and 200 (indicated by * used in the labeling of the gases) for each of the gases tested. AC of 100 for the green wavelength is referred to as green AC=100 below, and AC of 200 for the green wavelength is referred to as green AC=200 below.

Without taking into account standard deviation, the values for $H_2S$ in the plots of FIGS. 7 and 8 are distinguishable from the other hydrides tested for both intensities of green wavelength used. However, when standard deviation calculated is taken into account in FIG. 7, the $H_2S$ value for green AC=100 is not distinguishable from either of the $H_2Se$ values for both green AC=100 and green AC=200. When the standard deviation calculated is taken into account in FIG. 8, the $H_2S$ value for green AC=100 may have problems distinguishing from $GeH_4$, but is otherwise distinguishable from the other hydrides. The large values for the ratio of red wavelength AC to green wavelength AC, for each of GeH4, SiH4, and PH3 at green AC=100 (which may cause problems distinguishing $H_2S$ from $GeH_4$ under the conditions in Example 7), is surprising, since lower values such as those for each of GeH4, SiH4, and PH3 at green AC=200 were expected.

In FIG. 8, $H_2S$ and $H_2Se$ have no UV signal at the green wavelength of intensity which results in an AC green wavelength value of 200 due to malfunctioning of the testing system (i.e., the tape advanced too early).

Examples 8 to 11 were conducted to demonstrate the pattern recognition technique used for Examples 6 and 7 can be used to distinguish the $H_2S$ from a group of hydride gases, namely, $H_2Se$, $B_2H_6$, $GeH_4$, $SiH_4$, $PH_3$, and $AsH_3$—at different intensities of the wavelengths of light, different relative humidity, and different light sources. Examples 8 and 10 utilized the pattern recognition technique of Example 2. Examples 9 and 11 utilized the pattern recognition technique of Example 3. The system used to generate the data of FIGS. 9 and 11 (Examples 8 and 10) utilized a RGB-LED for the light source. The system used to generate the data of FIGS. 10 and 12 (Examples 9 and 11) utilized an UV+RG-LED for the light source. The gas streams tested for Examples 8 and 9 had a relative humidity of 10%. The gas streams tested for Examples 10 and 11 had a relative humidity of 65%-75%. The same 4× standard deviation used in the previous examples was calculated for Examples 8 to 11.

The results of Examples 8 to 11 are shown in FIGS. 9 to 12, respectively. In the pattern recognition techniques shown in FIGS. 9 and 12, intensities for green wavelength were varied such that AC for green wavelength was 100 and 200 (indicated by * used in the labeling of the gases) for each of the gases tested. AC of 100 for the green wavelength is referred to as green AC=100 below, and AC of 200 for the green wavelength is referred to as green AC=200 below.

Figure 10:
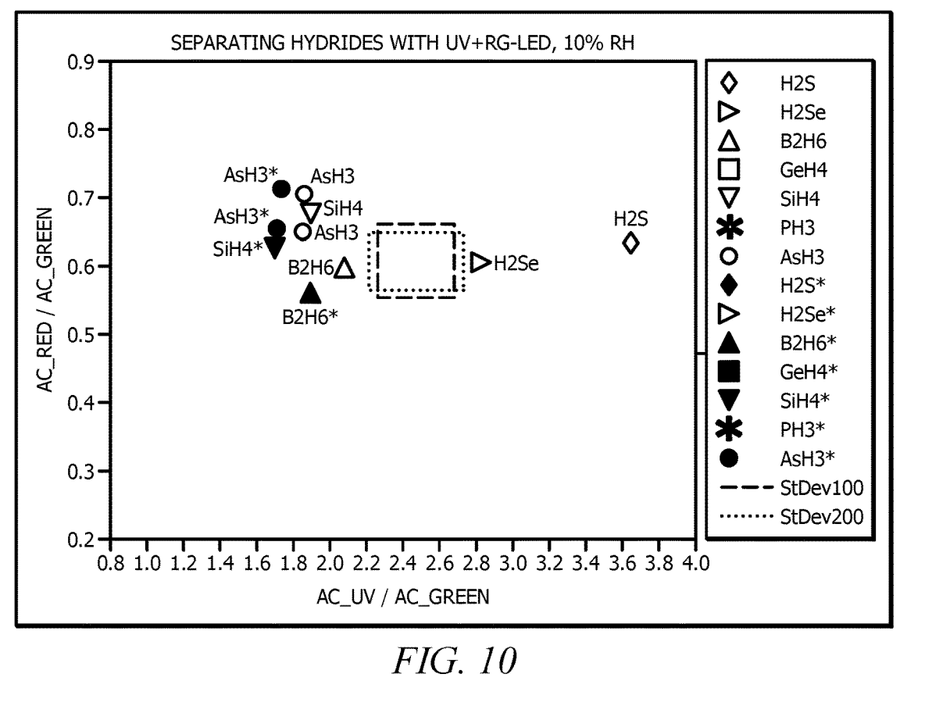
FIG. 10 is a graph of the ratio of AC for red wavelength to the AC for green wavelength versus the ratio of AC for UV wavelength to the AC for green wavelength, for selected gases using a UV+RG-LED at 10% relative humidity.
Figure 11:
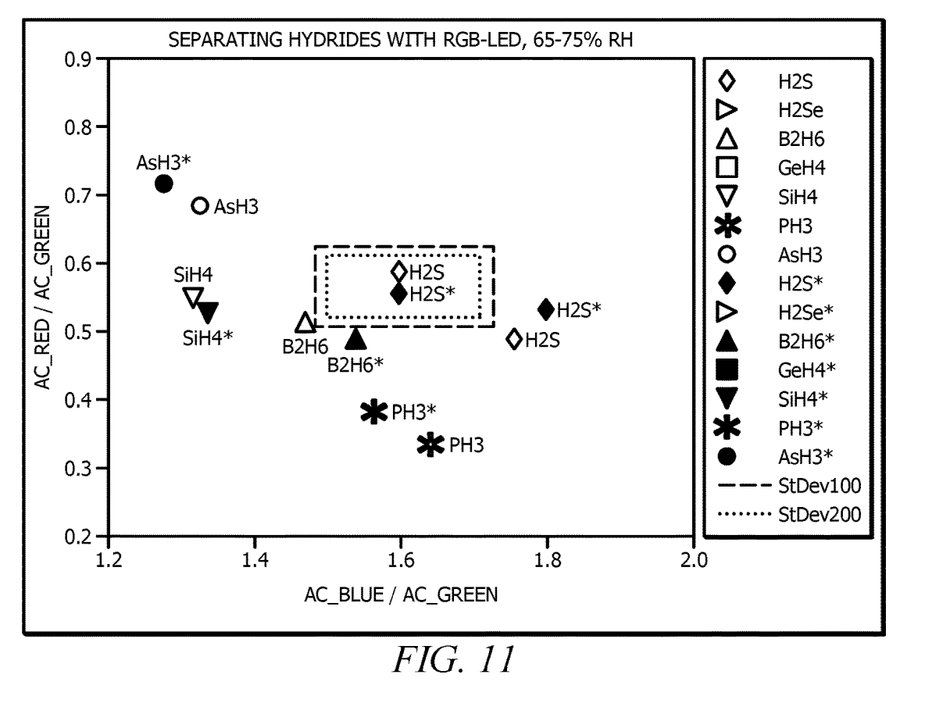
FIG. 11 is a graph of the ratio of AC for red wavelength to the AC for green wavelength versus the ratio of AC for blue wavelength to the AC for green wavelength, for selected gases using a RGB-LED at 65%-75% relative humidity.
Figure 12:
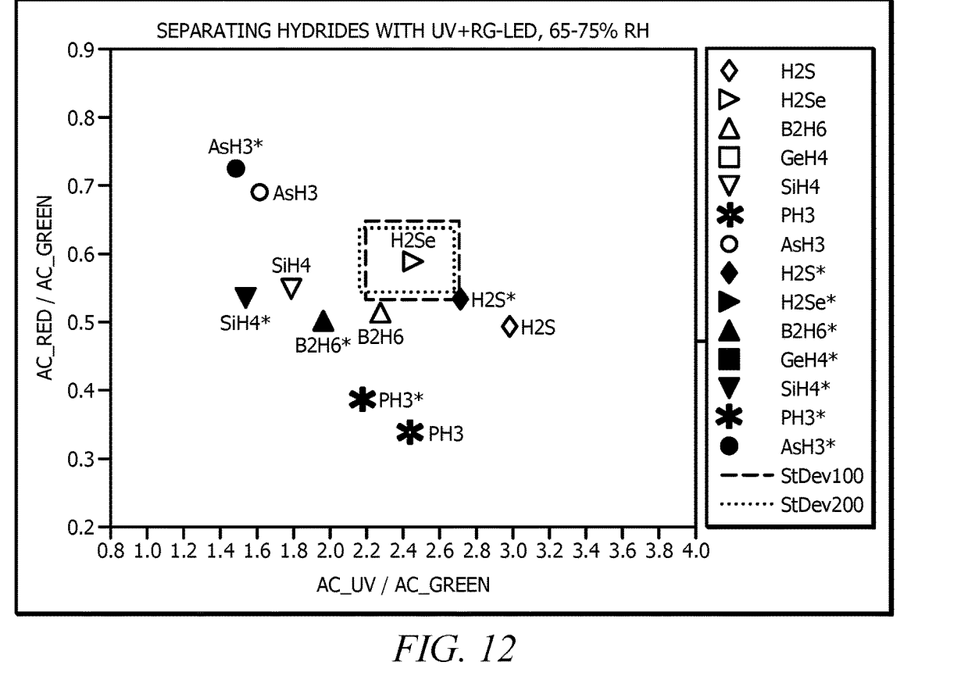
FIG. 12 is a graph of the ratio of AC for red wavelength to the AC for green wavelength versus the ratio of AC for UV wavelength to the AC for green wavelength, for selected gases using a UV+RG-LED at 65%-75% relative humidity.

Without taking into account standard deviation, the values for $H_2S$ in the plots of FIGS. 9 to 12 are distinguishable from the other hydrides tested for all conditions in Examples 8 to 11. When taking into account standard deviation, FIG. 12 shows $H_2Se$ at green AC=100 is not distinguishable from $H_2S$ at green AC=200.

Figure 9:
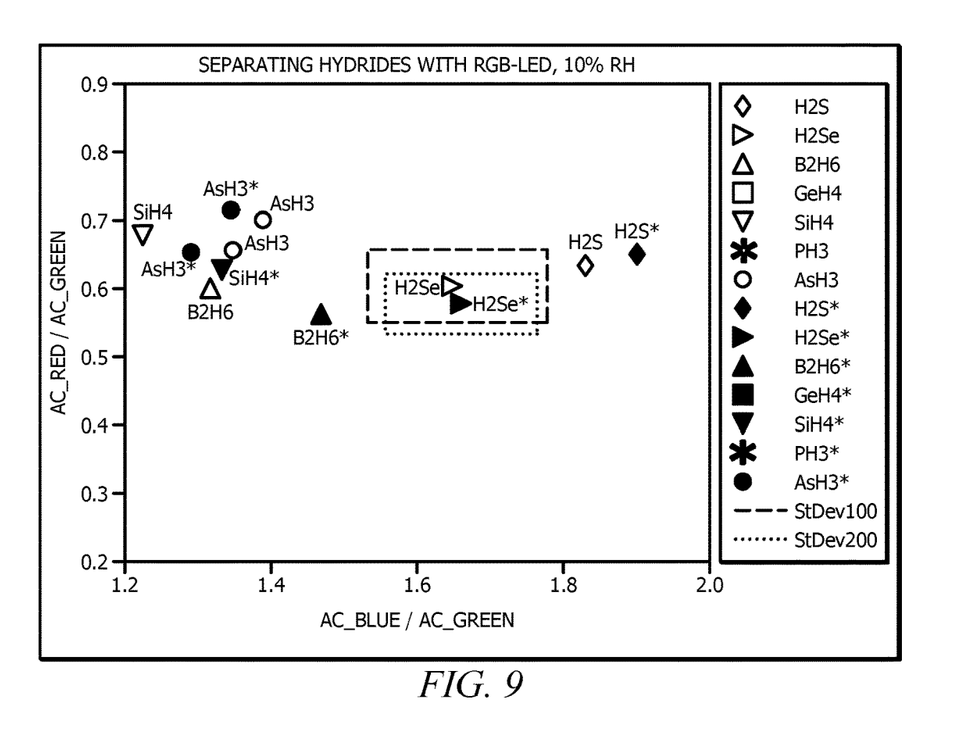
FIG. 9 is a graph of the ratio of AC for red wavelength to the AC for green wavelength versus the ratio of AC for blue wavelength to the AC for green wavelength, for selected gases using a RGB-LED at 10% relative humidity.

Comparing the data of FIGS. 9 and 11, and comparing the data of FIGS. 10 and 12 shows that the values change with variances in relative humidity. For example, the values among the different hydrides are more distinguishable (further apart) at a relative humidity of 65%-75% as shown in FIGS. 10 and 12 than at relative humidity of 10% shown in FIGS. 9 and 11. This indicates that some hydrides may be distinguishable from other hydrides when taking the relative humidity into account when identifying the target gas with pattern recognition techniques. Thus, using relative humidity in the identification of the gas can allow for distinguishing a target gas from a group of gases using the embodiments disclosed herein.

Figure 13:
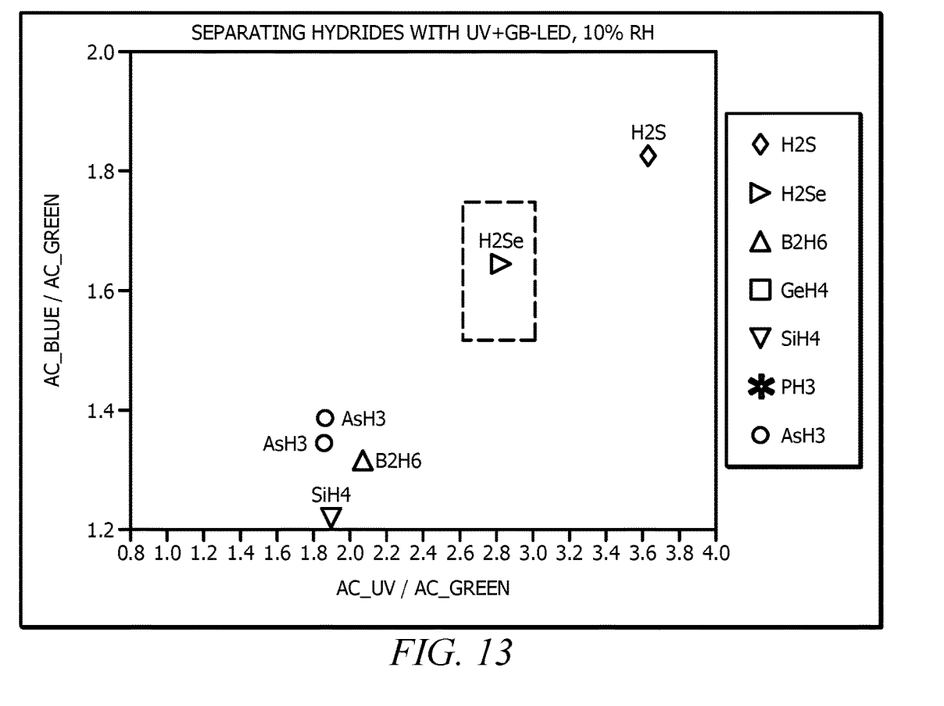
FIG. 13 is a graph of the ratio of AC for blue wavelength to the AC for green wavelength versus the ratio of AC for UV wavelength to the AC for green wavelength, for selected gases using a UV+GB-LED at 10% relative humidity.
Figure 14:
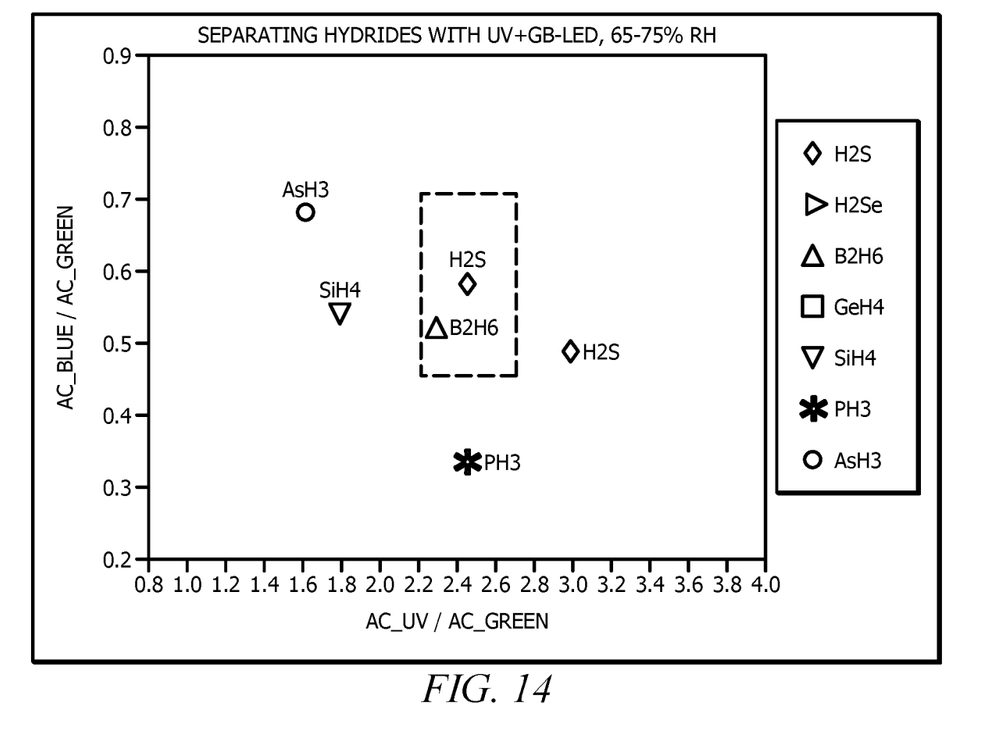
FIG. 14 is a graph of the ratio of AC for blue wavelength to the AC for green wavelength versus the ratio of AC for UV wavelength to the AC for green wavelength, for selected gases using a UV+GB-LED at 65%-75% relative humidity.

Example 12 and 13 demonstrate another pattern recognition technique which can be used to distinguish $H_2S$ from a group of hydride gases, namely, $H_2Se$, $B_2H_6$, $GeH_4$, $SiH_4$, $PH_3$, and $AsH_3$. The pattern recognition technique in Examples 12 and 13 involved calculating a first ratio of adjusted counts (AC) for blue wavelength to the AC for green wavelength, calculating a second ratio of AC for UV wavelength to the AC for green wavelength, and comparing the first ratio and second ratio to determine any differences between $H_2S$ and the group of hydride gases mentioned above. The AC for green wavelength was 100. The systems used to generate the data of FIGS. 13 and 14 (Examples 12 and 13, respectively) utilized an UV+RG-LED for the light source. The relative humidity of the gas stream used in Example 12 was 10%, and the relative humidity of the gas stream used in Example 13 was 65%-75%. The 4× standard deviation was calculated for $H_2Se$. The results of Examples 12 and 13 are shown in FIGS. 13 and 14. As can be seen, all hydrides are distinguishable from $H_2S$ using the pattern recognition technique. Moreover, the values among the different hydrides are more distinguishable (further apart) at a relative humidity of 65%-75% than at relative humidity of 10%. This indicates that some hydrides may be distinguishable from other hydrides when taking the relative humidity into account when identifying the target gas with pattern recognition techniques. Thus, using relative humidity in the identification of the gas can allow for distinguishing a target gas from a group of gases using the embodiments disclosed herein.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification, and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for identifying a target gas present in a gas stream, the system comprising:
    a paper tape reactive with each target gas of a group of target gases, wherein the group of target gases comprises a first target gas and a second target gas, and wherein formation of a reaction product as a stain on the paper tape is indicative of presence of the first target gas or presence of the second target gas in the gas stream, wherein the paper tape is a hydride tape;
    a light source configured to emit at least three wavelengths of light selected from red, green, blue, or ultra-violet wavelength;
    a detector configured to detect a reflected portion of light for each of the at least three wavelengths of light, wherein each reflected portion of light reflects from the paper tape;
    a sensor configured to sense a humidity and a temperature of the gas stream; and
    a processor/controller connected to the detector, wherein in response to the paper tape reacting with the target gas present in the gas stream to form the stain, the processor/controller is configured to:
        receive a digital signal containing wavelength detection information for the reflected portions of light from the detector;
        use pattern recognition to distinguish between the presence of the first target gas and the presence of the second target gas, wherein the pattern recognition includes, for the first target gas, the second target gas, or a combination thereof:
            calculating a first ratio of adjusted counts (AC) for red wavelength to the AC for green wavelength,
            calculating a second ratio of AC for UV wavelength to the AC for the green wavelength, and
            comparing the first ratio and the second ratio to determine a characteristic, a color pattern, or a combination thereof with respect to the stain from the wavelength detection information and the sensed humidity and temperature, wherein each AC is an average AC calculated from multiple light pulses of each respective wavelength over a period of total time; and
        identify the target gas present in the gas stream as either the first target gas or the second target gas based on identifying the determined characteristic, color pattern, or a combination thereof as belonging to either the first target gas or the second target gas.

2. The system of claim 1, further comprising:
    a datastore operably connected to the processor/controller to record characteristics, color patterns, or both characteristics and color patterns generated by the processor/controller.

3. The system of claim 1, wherein in order to use pattern recognition, the processor/controller is configured to:
    use a pattern recognition technique which incorporates the one or more of the humidity and the temperature of the gas stream, to determine the characteristic, color pattern, or combination thereof of the reflected portion of light for each of the at least three wavelengths which is detected;
    match at least one of the determined characteristic and the determined color pattern with a previously recorded characteristic or a previously recorded color pattern; and
    identify at least one of the determined characteristic and the determined color pattern as belonging to the first target gas or the second target gas based on such matching.

4. The system of claim 3, wherein previously recorded characteristics and previously recorded color patterns are determined by:
    relating known first target gas stains and known second target gas stains to one another to calculate a characteristic or a color pattern for each reflected portion of light for different wavelengths of light, wherein the known stains are measured at different light wavelengths and different humidity levels and/or temperatures;
    assigning a first calculated characteristic or a first calculated color pattern to the first target gas as a first previously recorded characteristic or a first previously recorded color pattern of the first target gas; and
    assigning a second calculated characteristic or a second calculated color pattern to the second target gas as a second previously recorded characteristic or a second previously recorded color pattern of the second target gas.

5. The system of claim 1, wherein each of the at least three wavelengths is emitted as a separate light pulse.

6. The system of claim 5, wherein each of the light pulses has a duration of at least 1 millisecond (ms).

7. The system of claim 5, wherein the processor/controller is further configured to:
    calculate, for each of the light pulses of each wavelength of light emitted from the light source, the adjusted count defined by the following equation:

$AC=[S(0)/S(t)]-1$, wherein S(0) is an original intensity of the light emitted from the light source at time zero and S(t) is an actual intensity of the reflected portion of the light which is detected at time, t, which is greater than 0.

8. The system of claim 1, wherein the at least three wavelengths of light are i) red, green, and blue, ii) ultra-violet, red, and green, iii) ultra-violet, green, and blue, or iv) ultra-violet, red, and blue.

9. The system of claim 1, wherein the wavelength detection information further uses a ratio of AC for red wavelength to AC for green wavelength versus a ratio of AC for blue wavelength to AC for green wavelength, for the first target gas, the second target gas, or a combination thereof.

10. The system of claim 1, wherein the light source includes a UV+GB-LED, a UV+RG-LED, an RGF-LED, or a combination thereof.

11. The system of claim 1, wherein the group of target gases comprises hydride gases, the first target gas is $H_2S$, and the second target gas comprises one or more of $B_2H_6$, $H_2Se$, $GeH_4$, $SiH_4$, $PH_3$, $AsH_3$, $NH_3$, or a combination thereof.

12. The system of claim 1, wherein the paper tape indicates the presence of the first target gas or the presence of the second target gas in the gas stream based at least in part on relative humidity thereof.

13. A method for identifying a target gas present in a gas stream, the method comprising:
contacting the gas stream with a paper tape, wherein the paper tape is a hydride tape configured to react with each target gas of a group of target gases, wherein the group of target gases comprises a first target gas and a second target gas, and wherein formation of a reaction product as a stain on the paper tape is indicative of presence of the first target gas or presence of the second target gas in the gas stream;
emitting at least three wavelengths of light selected from red, green, blue, and ultra-violet wavelengths from a light source;
detecting a reflected portion for each of the at least three wavelengths of light which reflects from the paper tape;
sensing a humidity and a temperature of the gas stream; and
using pattern recognition to distinguish between the presence of the first target gas and the second target gas, wherein pattern recognition includes, for the first target gas, the second target gas, or a combination thereof:
calculating a first ratio of adjusted counts (AC) for red wavelength to the AC for green wavelength,
calculating a second ratio of AC for UV wavelength to the AC for the green wavelength, and
comparing the first ratio and the second ratio to determine a characteristic, a color pattern, or a combination thereof with respect to the stain from wavelength detection information and the sensed humidity and temperature, wherein each AC is an average AC calculated from multiple light pulses of each respective wavelength over a period of total time; and
identifying the target gas present in the gas stream as either the first target gas or the second target gas based on identifying the determined characteristic, color pattern, or a combination thereof as belonging to either the first target gas or the second target gas.

14. The method of claim 13, wherein the first target gas is $B_2H_6$ and the second target gas comprises one or more other hydrides.

15. The method of claim 13, wherein the step of using pattern recognition comprises:
using a pattern recognition technique which incorporates the humidity, the temperature, or both the humidity and the temperature of the gas stream, to determine the characteristic, the color pattern, or the combination thereof of the reflected portion of light for each of the at least three wavelengths which is detected;
matching at least one of the determined characteristic and the determined color pattern with a previously recorded characteristic or a previously recorded color pattern; and
identifying at least one of the determined characteristic and the determined color pattern as belonging to the first target gas or the second target gas based on such matching.

16. The method of claim 15, wherein previously recorded characteristics and previously recorded color patterns are determined by:
relating known first target gas stains and known second target gas stains to one another to calculate a characteristic or a color pattern for each reflected portion of light for different wavelengths of light, wherein the known stains are measured at different light wavelengths and different humidity levels and/or temperatures;
assigning a first calculated characteristic or a first calculated color pattern to the first target gas as a first previously recorded characteristic or a first previously recorded color pattern of the first target gas; and
assigning a second calculated characteristic or a second calculated color pattern to the second target gas as a second previously recorded characteristic or a second previously recorded color pattern of the second target gas.

17. The method of claim 13, wherein the at least three wavelengths of light are i) red, green, and blue, ii) ultra-violet, red, and green, iii) ultra-violet, green, and blue, or iv) ultra-violet, red, and blue.

18. The method of claim 13, further comprising:
calculating, by a processor/controller, for each light pulse of each wavelength of light emitted from the light source, the AC defined by the following equation:

$AC=[S(0)/S(t)]-1$, wherein S(0) is an original intensity of the light emitted from the light source at time zero and S(t) is an actual intensity of the reflected portion of the light which is detected at time, t, which is greater than 0.

19. The method of claim 13, wherein the wavelength detection information further includes a ratio of AC for red wavelength to AC for green wavelength versus a ratio of AC for blue wavelength to AC for green wavelength, for the first target gas, the second target gas, or a combination thereof, and wherein the AC are calculated by a processor/controller.

* * * * *